United States Patent
Inoue

(10) Patent No.: US 11,691,704 B2
(45) Date of Patent: Jul. 4, 2023

(54) POSTURE CONTROL SYSTEM FOR HULL AND MARINE VESSEL

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 246 days.

(21) Appl. No.: 17/072,094

(22) Filed: Oct. 16, 2020

(65) Prior Publication Data
US 2021/0129954 A1 May 6, 2021

(51) Int. Cl.
| | |
|---|---|
| B63B 1/26 | (2006.01) |
| B63B 79/40 | (2020.01) |
| B63B 79/10 | (2020.01) |
| B63B 34/00 | (2020.01) |
| G05D 1/02 | (2020.01) |

(52) U.S. Cl.
CPC .............. *B63B 79/40* (2020.01); *B63B 34/05* (2020.02); *B63B 79/10* (2020.01); *G05D 1/0206* (2013.01)

(58) Field of Classification Search
CPC ....... B63B 34/05; B63B 39/061; B63B 79/40; B63B 35/14; B63B 79/10; B63B 1/246; B63B 1/26; B63B 1/285; B63B 1/248; B63H 25/42; B63H 25/46; G05D 1/0206; B64U 10/10; B64U 2101/30
See application file for complete search history.

(56) References Cited

U.S. PATENT DOCUMENTS

| | | | |
|---|---|---|---|
| 5,113,780 A | 5/1992 | Bennett et al. | |
| 5,474,012 A | 12/1995 | Yamada et al. | |
| 5,878,686 A | 3/1999 | Anderson | |
| 6,116,180 A | 9/2000 | Thompson | |
| 7,381,108 B1 | 6/2008 | Salmon | |
| 9,580,150 B2 * | 2/2017 | Lee | B63B 49/00 |
| 11,034,418 B2 * | 6/2021 | Lee | B63B 79/30 |
| 11,414,162 B2 * | 8/2022 | Inoue | G05D 1/0875 |
| 11,453,467 B2 * | 9/2022 | Inoue | B63B 39/061 |

(Continued)

FOREIGN PATENT DOCUMENTS

| | | | |
|---|---|---|---|
| IT | GE20130062 A1 | 1/2015 | |
| JP | 08-40380 A | 2/1996 | |

(Continued)

OTHER PUBLICATIONS

Stommel et al., Model-Free Detection, Encoding, Retrieval, and Visualization of Human Poses From Kinect Data, 2014, IEEE, p. 865-875 (Year: 2014).*

(Continued)

*Primary Examiner* — Mcdieunel Marc
(74) *Attorney, Agent, or Firm* — Keating and Bennett, LLP

(57) ABSTRACT

A posture control system for a hull, and a marine vessel including the posture control system, allows crew members to fish more comfortably and includes a posture control tab attached to a stern of the hull to control a posture of the hull, a driver to drive the posture control tab, and a controller to control the driver. When it is determined that the hull has changed to a fishing mode, the controller causes the driver to raise the posture control tab to a predetermined position.

15 Claims, 10 Drawing Sheets

(56) References Cited

U.S. PATENT DOCUMENTS

| | | | | |
|---|---|---|---|---|
| 2015/0088346 | A1* | 3/2015 | Lee | G01B 11/16 |
| | | | | 356/32 |
| 2019/0308693 | A9* | 10/2019 | Lee | E21B 17/01 |
| 2021/0129949 | A1* | 5/2021 | Inoue | B63B 43/00 |
| 2021/0197943 | A1* | 7/2021 | Inoue | B63B 39/061 |

FOREIGN PATENT DOCUMENTS

| | | |
|---|---|---|
| JP | 09-506573 A | 6/1997 |
| JP | 10-278889 A | 10/1998 |
| JP | 2001-294197 A | 10/2001 |
| JP | 2002-122668 A | 4/2002 |

OTHER PUBLICATIONS

Walter et al., Appearance-based object reacquisition for mobile manipulation, 2010, IEEE, p. 1-8 (Year: 2010).*

Tang et al., Fusion of local appearance with stereo depth for object tracking, 2008, IEEE, p. 1-8 (Year: 2008).*

Ramanathan et al., Human Action Recognition With Video Data: Research and Evaluation Challenges, 2014, IEEE, p. 650-663 (Year: 2014).*

Zipwake, "Operators Manual Dynamic Trim Control System", Retrieved from the Internet http://www.zipwake.com, retrieved on Jun. 3, 2020, 147 pages.

Official Communication issued in corresponding European Patent Application No. 20205169.4, dated Apr. 7, 2021.

Official Communication issued in corresponding European Patent Application No. 20205169.4 dated Apr. 17, 2023.

* cited by examiner

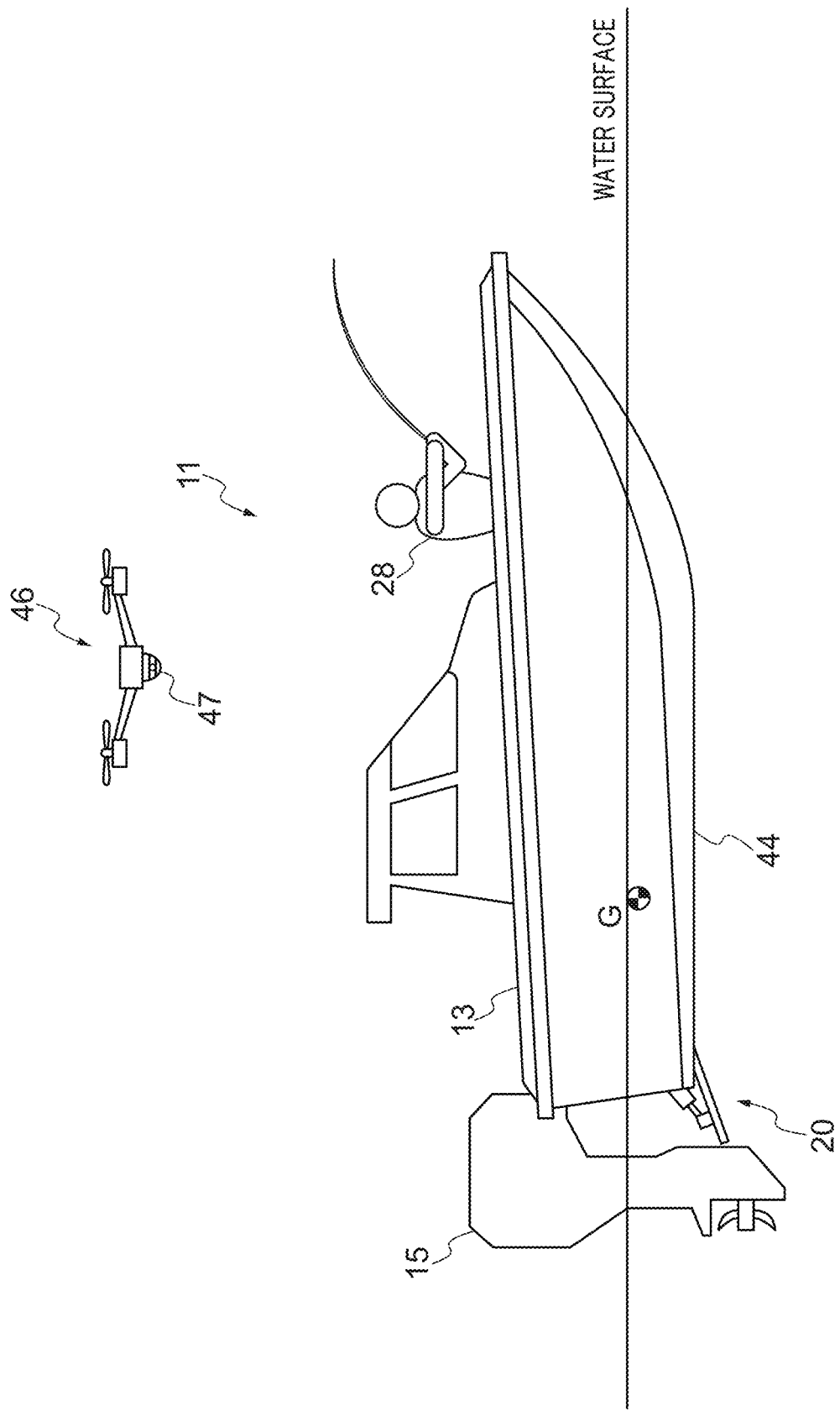

POSTURE CONTROL SYSTEM FOR HULL AND MARINE VESSEL

CROSS REFERENCE TO RELATED APPLICATIONS

This application claims the benefit of priority to Japanese Patent Application No. 2019-201343 filed on Nov. 6, 2019. The entire contents of this application are hereby incorporated herein by reference.

BACKGROUND OF THE INVENTION

1. Field of the Invention

The present invention relates to a posture control system for a hull and a marine vessel.

2. Description of the Related Art

Conventionally, a planing boat includes posture control tabs such as trim tabs on a starboard side and a port side of a stern (see, for example, Japanese Laid-Open Patent Publication (kokai) No. 2001-294197 and Zipwake, "Dynamic Trim-Control System" (URL: http://www.zipwake.com, hereinafter referred to as Zipwake)). The planing boat controls a posture of the hull by moving the posture control tabs up and down. However, in order to control the posture of the hull by moving the posture control tabs up and down, a vessel operator needs to be skilled. Therefore, in recent years, a mode for automatically controlling the up and down movement of the posture control tabs, for example, a selectable auto trim tab mode has been used. As one example of such an auto trim tab mode, for example, in the technique described in Japanese Laid-Open Patent Publication (kokai) No. 2001-294197, the posture of the hull is obtained by a gyroscope, and a sailing posture of the marine vessel is controlled by moving the trim tabs up and down.

Since the trim tabs are lowered regardless of an intention of the vessel operator in the auto trim tab mode, the trim tabs may be lowered even when a crew member is fishing.

However, if the trim tab is lowered when the crew member is fishing, the crew member needs to be careful not to cause a fishing line to be entangled with the lowered trim tab. For example, the crew member needs to take a position on the marine vessel such that the fishing line does not drift toward the stern when considering the flow of the tide. Therefore, there is room for improvement for the crew member to fish more easily.

SUMMARY OF THE INVENTION

Preferred embodiments of the present invention provide posture control systems for hulls and marine vessels that each allow a crew member to fish more easily.

According to a preferred embodiment of the present invention, a posture control system includes a posture control tab attached to a stern of the hull to control a posture of a hull, a driver to drive the posture control tab, and a controller to control the driver. When it is determined that the hull has changed to a fishing mode, the controller causes the driver to raise the posture control tab to a predetermined position.

With this configuration, when it is determined that the hull has changed to the fishing mode, the posture control tab rises to the predetermined position. Therefore, the fishing line is not entangled with the posture control tab even if the fishing line drifts toward the stern. This eliminates the need for the crew member to take a position on the marine vessel such that the fishing line does not drift toward the stern considering the flow of the tide, thus allowing the crew member to fish more easily.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is an external view schematically showing a configuration of a first variation of the marine vessel according to a preferred embodiment of the present invention.

DETAILED DESCRIPTION OF THE PREFERRED EMBODIMENTS

Hereinafter, preferred embodiments of the present invention will be described with reference to the drawings.

Figure 1:
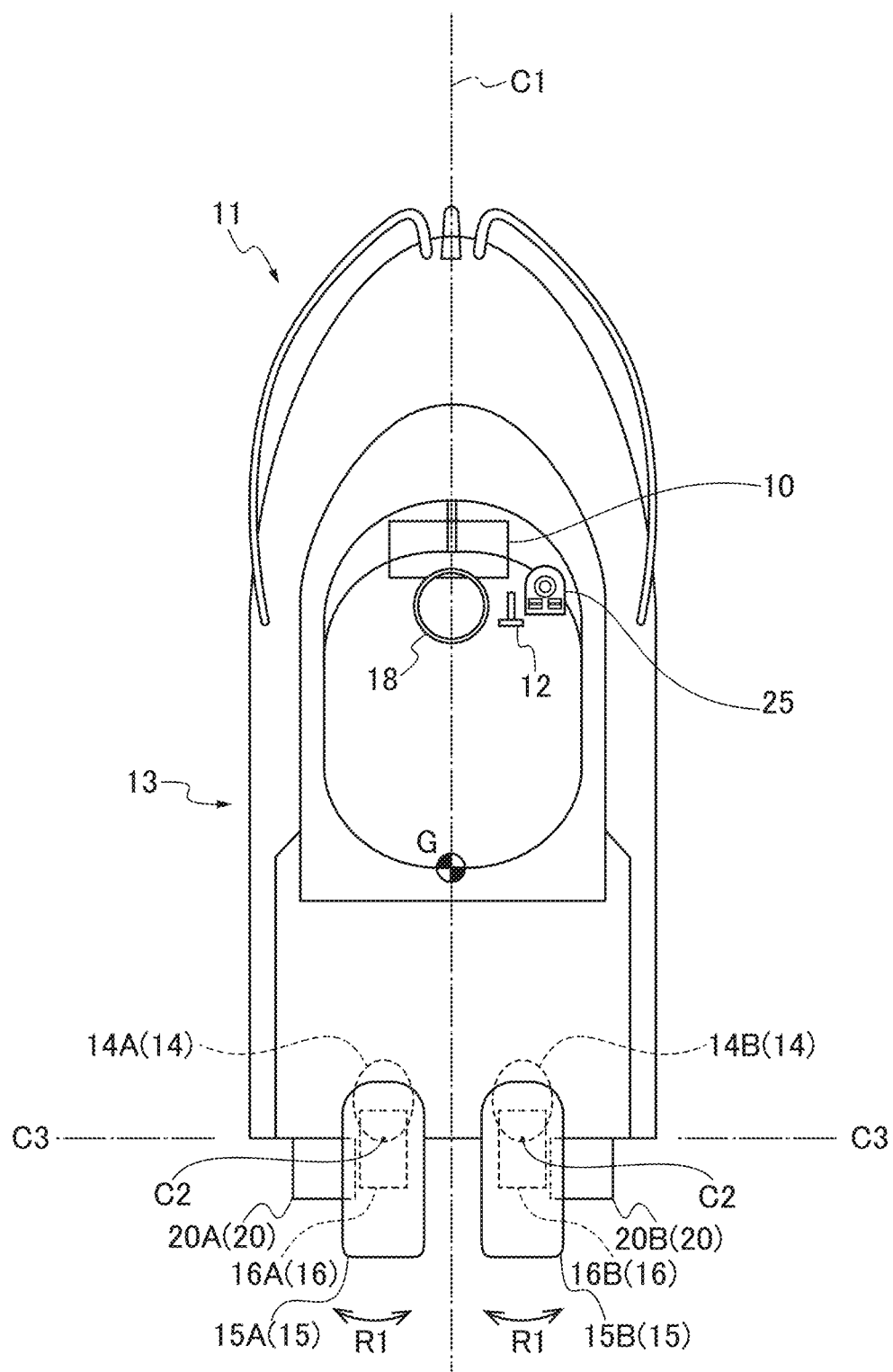
FIG. 1 is a top view of a marine vessel including a posture control system according to a preferred embodiment of the present invention.

FIG. 1 is a top view of a marine vessel including a posture control system according to a preferred embodiment of the present invention. This marine vessel 11 is, for example, a planing boat, and includes a hull 13, a plurality of (for example, two) outboard motors 15 defining and functioning as marine propulsion devices mounted on the hull 13, and a plurality (for example, a pair) of trim tabs 20. A central unit 10, a steering wheel 18, a throttle lever 12, and a remote control switch (hereinafter simply referred to as "remote control") 25 are provided in the vicinity of a cockpit on the hull 13.

In the following description, front, rear, left, right, up, and down directions refer to front, rear, left, right, up, and down directions of the hull 13, respectively. For example, as shown in FIG. 1, a center line C1 extending in the front-rear direction of the hull 13 passes through the center of gravity G of the marine vessel 11. The front-rear direction is a direction along the center line C1. The front direction is a direction toward the upper side along the center line C1 in FIG. 1. The rear direction is a direction toward the lower side along the center line C1 in FIG. 1. The left-right direction is a left-right direction when the hull 13 is viewed from the rear. The vertical direction is a direction perpendicular to the front-rear direction and the left-right direction.

The two outboard motors 15 are attached side by side to the stern of the hull 13. When distinguishing the two outboard motors 15, the one disposed on the port side is referred to as "outboard motor 15A" and the one disposed on the starboard side is referred to as "outboard motor 15B." The outboard motors 15A and 15B are attached to the hull 13 via attachment units 14 (14A and 14B), respectively. The outboard motors 15A and 15B include engines 16 (16A and 16B), respectively, which are, for example, internal combustion engines. Each outboard motor 15 obtains a propulsive force by a propeller (not shown) rotated by a driving force of the corresponding engine 16.

Figure 3:
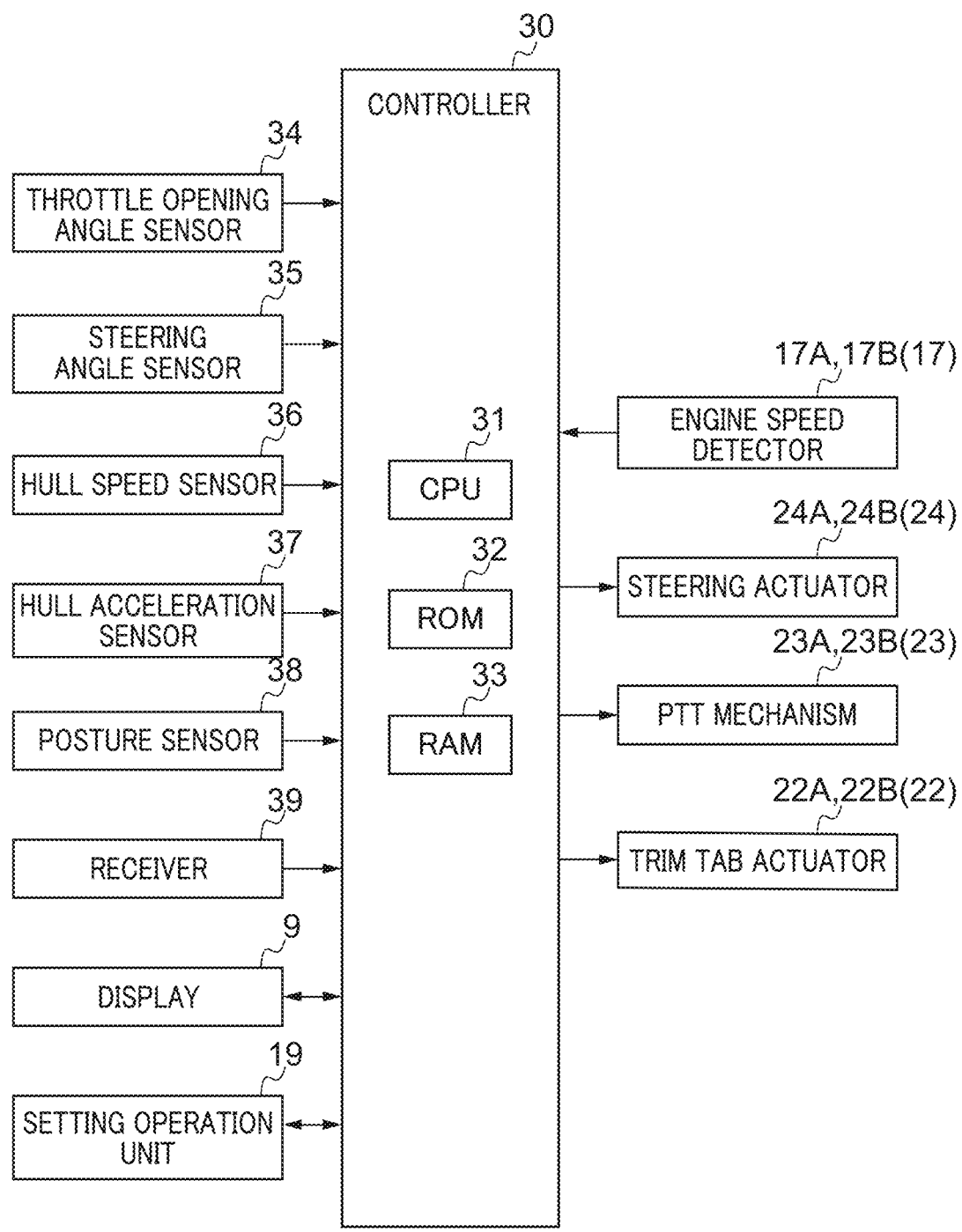
FIG. 3 is a block diagram of a vessel operation system of the marine vessel.

The attachment units 14A and 14B each include a swivel bracket, a clamp bracket, a steering shaft, and a tilt shaft (none is shown). The attachment units 14A and 14B further include power trim and tilt mechanisms (PTT mechanisms) 23 (23A and 23B), respectively (FIG. 3). Each PTT mechanism 23 rotates the corresponding outboard motor 15 around the tilt shaft. This allows an inclination angle of the outboard motor 15 with respect to the hull 13 to be changed, and thus allows a trim adjustment to be performed and the outboard motor 15 to be tilted up and down. The outboard motor 15 is pivotable around a pivot center C2 (around the steering axis) with respect to the swivel bracket. The outboard motor 15 pivots left and right (R1 direction) around the pivot center C2 by operating the steering wheel 18. With this operation, the marine vessel 11 is steered.

The pair of trim tabs 20 are attached to the port side and the starboard side of the stern swingably around a swing axis C3. When distinguishing the two trim tabs 20, the one disposed on the port side is referred to as "trim tab 20A", and the one disposed on the starboard side is referred to as "trim tab 20B."

Figure 2:
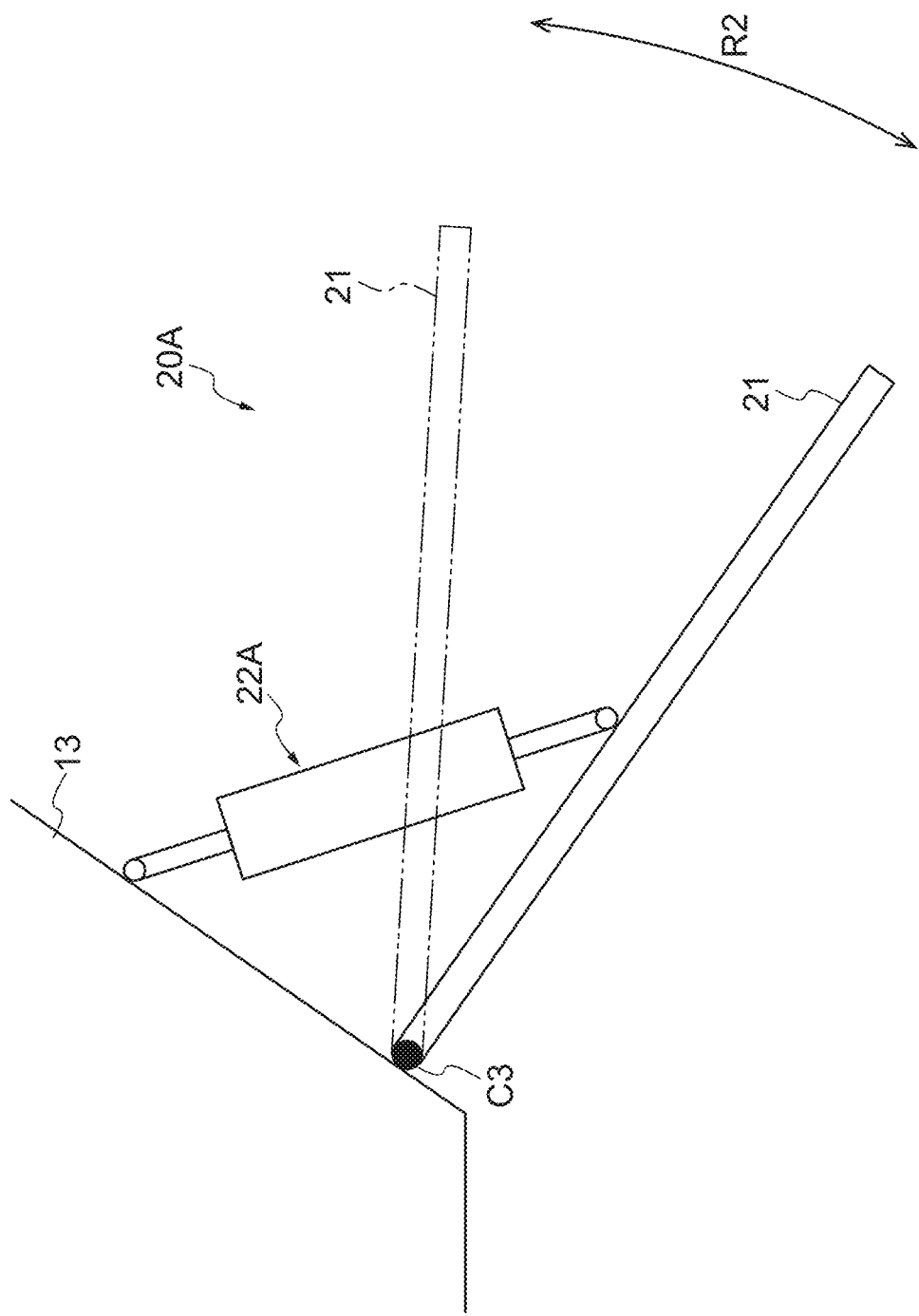
FIG. 2 is a side view of a trim tab attached to the hull.

FIG. 2 is a side view of the trim tab 20A attached to the hull 13. Since the trim tabs 20A and 20B have a common configuration, the configuration of the trim tab 20A will be described as a representative. The trim tab 20A includes a trim tab actuator 22A (driver) and a tab body 21. The tab body 21 is attached to a rear portion of the hull 13 swingably around the swing axis C3. For example, the proximal end of the tab body 21 is attached to the rear portion of the hull 13, and the free end of the tab body 21 swings up and down (in a swing direction R2) about the swing axis C3. The tab body 21 is one example of a posture control tab that controls the posture of the hull 13.

The trim tab actuator 22A is disposed between the tab body 21 and the hull 13 such that it connects the tab body 21 and the hull 13. The trim tab actuator 22A drives the tab body 21 to swing with respect to the hull 13. Note that the tab body 21 shown by the two-dot chain line in FIG. 2 shows a position where the free end is at the highest level, and this position corresponds to a housed position. Meanwhile, the tab body 21 shown by the solid line in FIG. 2 is at a position where the free end of the tab body 21 is lower than the ship's bottom (keel). Note that a swingable range of the tab body 21 is not limited to the range shown in FIG. 2. The swing direction R2 is defined based on the swing axis C3. The swing axis C3 is perpendicular or substantially perpendicular to the center line C1, and is, for example, parallel or substantially parallel to the left-right direction. Note that the swing axis C3 may extend obliquely to intersect the pivot center C2.

FIG. 3 is a block diagram of a vessel operation system of the marine vessel 11. The marine vessel 11 includes a controller 30, a throttle opening angle sensor 34, a steering angle sensor 35, a hull speed sensor 36, a hull acceleration sensor 37, a posture sensor 38, a receiver 39, a display 9, and a setting operation unit 19. The marine vessel 11 also includes engine speed detectors 17 (17A and 17B), steering actuators 24 (24A and 24B), PTT mechanisms 23 (23A and 23B), and trim tab actuators 22 (22A and 22B) (see also FIG. 2).

The controller 30, the throttle opening angle sensor 34, the steering angle sensor 35, the hull speed sensor 36, the hull acceleration sensor 37, the posture sensor 38, the receiver 39, the display 9, and the setting operation unit 19 are included in the central unit 10, or disposed in the vicinity of the central unit 10. The steering actuators 24A and 24B and the PTT mechanisms 23A and 23B correspond to the outboard motors 15A and 15B, respectively. The engine speed detectors 17 are provided in the corresponding outboard motors 15. The trim tab actuators 22A and 22B are included in the trim tabs 20A and 20B, respectively.

The controller 30 includes a central processing unit (CPU) 31, a read-only memory (ROM) 32, a random-access memory (RAM) 33, and a timer (not shown). A control program is stored in the ROM 32. The CPU 31 implements various control processes by loading the control program stored in the ROM 32 into the RAM 33 and executing the control program. The RAM 33 provides a work area for the CPU 31 to execute the control program.

Detection results obtained by the sensors 34 to 38 and the engine speed detectors 17 are supplied to the controller 30. The throttle opening angle sensor 34 detects an opening angle of a throttle valve (not shown). Note that the opening angle of the throttle valve changes according to an operation amount of the throttle lever 12. The steering angle sensor 35 detects a rotation angle when the steering wheel 18 is rotated. Note that the steering angle sensor 35 may detect a rotation angle when a joystick 42 (described below) of the remote control 25 is operated. The hull speed sensor 36 and the hull acceleration sensor 37 detect the speed and acceleration level of the marine vessel 11 (hull 13), respectively.

The posture sensor 38 includes, for example, a gyro sensor, a magnetic direction sensor, or the like. Based on a signal output from the posture sensor 38, the controller 30 calculates a roll angle, a pitch angle, and a yaw angle. Note that the controller 30 may calculate the roll angle and the pitch angle based on a signal output from the hull acceleration sensor 37. The receiver 39 includes a global navigation satellite systems (GNSS) receiver such as a global positioning system (GPS), and includes a function of receiving GPS signals and various types of signals as positional information. A specified signal to notify that the marine vessel is in a speed-restricted area is transmitted from the speed-restricted area or land in the vicinity of the area. The speed-restricted area refers to an area where it is required to restrict the speed of the marine vessel to a predetermined speed or less in a port or the like. The receiver 39 also includes a function of receiving the specified signal. Note that the acceleration of the hull 13 may be acquired from the GPS signal received by the receiver 39.

The engine speed detectors 17 detect the number of revolutions of the corresponding engines 16 per unit period of time (hereinafter, referred to as "engine speed"). The display 9 displays various types of information items. The setting operation unit 19 includes a setting operator to perform various types of settings and an input operator to input various types of instructions in addition to the operator performing operations related to the vessel operation and a PTT operation switch (none is shown).

The steering actuators 24 cause the corresponding outboard motors 15 to pivot with respect to the hull 13 around the pivot center C2. The direction in which the propulsive force acts with respect to the center line C1 of the hull 13 is changeable by pivoting each of the outboard motors 15A and 15B about the pivot center C2. The PTT mechanisms 23 cause the corresponding outboard motors 15 to pivot around the tilt axis to tilt the outboard motors 15 with respect to the clamp bracket. The PTT mechanisms 23 are operated by operating the PTT operation switch, for example. This allows the tilt angle of the outboard motors 15 with respect to the hull 13 to be changed.

The trim tab actuators 22A and 22B are controlled by the controller 30. For example, the controller 30 outputs control signals to respective trim tab actuators 22A and 22B, such that the trim tab actuators 22A and 22B move. The operation of the trim tab actuators 22A and 22B causes the corresponding tab bodies 21 to swing. Note that the actuators used in the PTT mechanisms 23 and the trim tab actuators 22A and 22B may be hydraulic or electric.

Note that the controller 30 may acquire results of detection by the engine speed detectors 17 via a remote control ECU 29 described below. The controller 30 may control each engine 16 via an outboard motor ECU (not shown) provided in each outboard motor 15.

Figure 4:
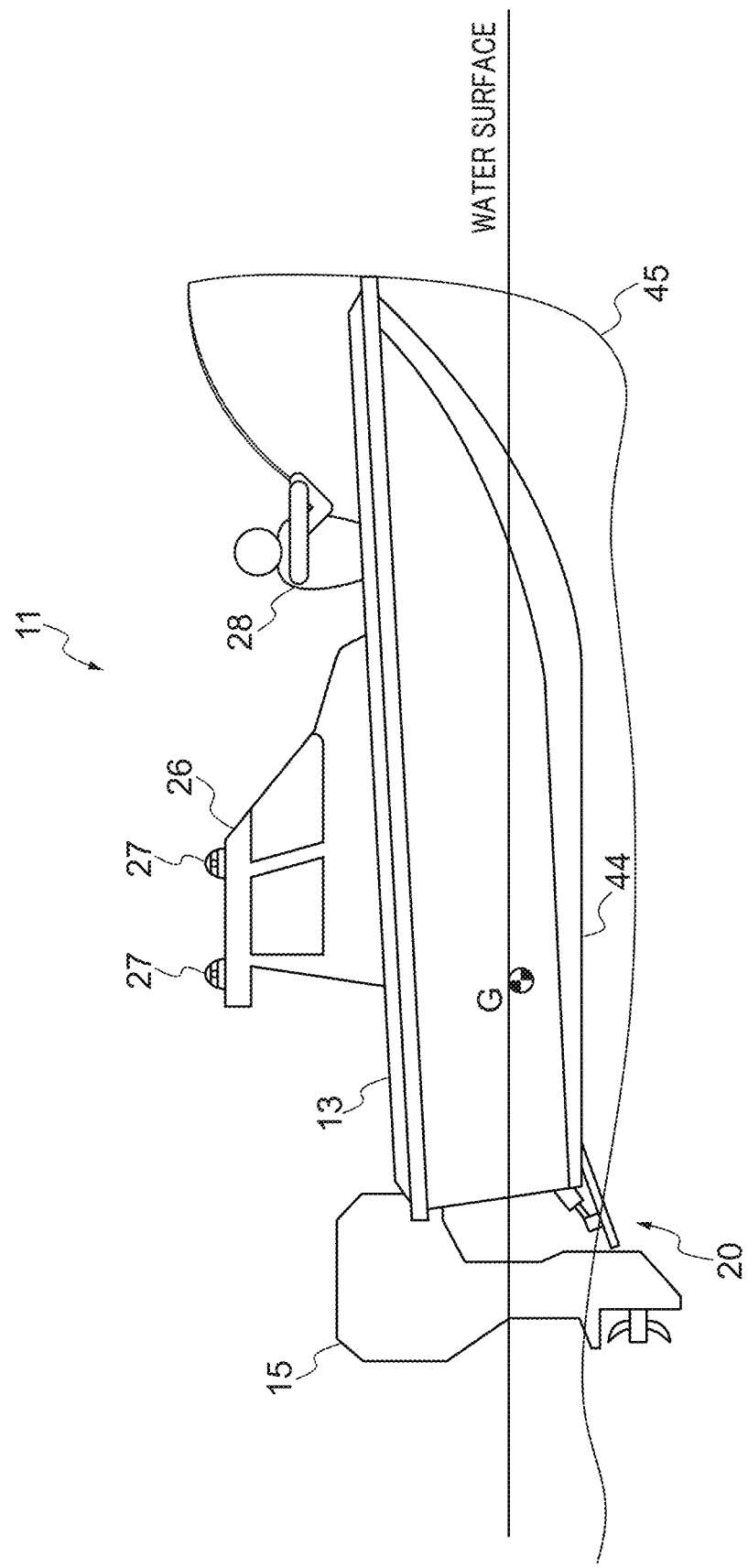
FIG. 4 is an external view schematically showing a configuration of the marine vessel according to a preferred embodiment of the present invention.

As shown in FIG. 4, the marine vessel 11 includes, for example, at least one camera 27 (image capturing device) on a roof of a cabin 26 to acquire conditions on a deck of the hull 13 including a crew member 28 as an image. Note that the camera 27 may be disposed not only on the roof of the cabin 26 but on an upper portion of a mast (not shown) or the like.

Figure 5:
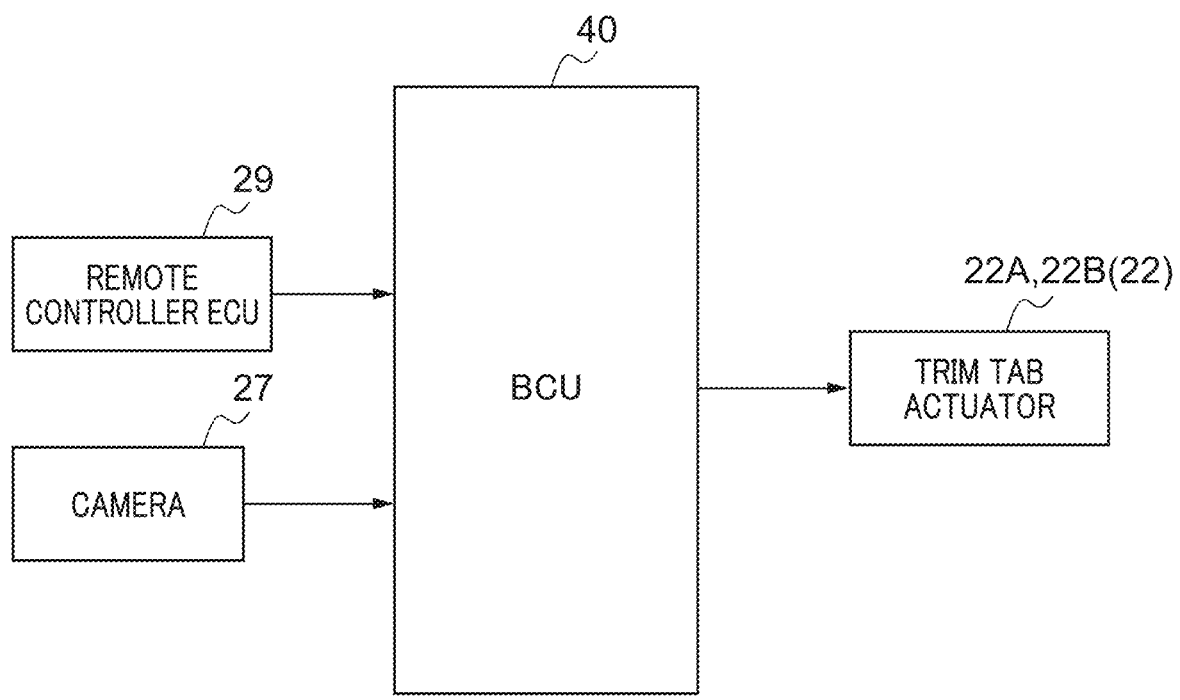
FIG. 5 is a block diagram of the posture control system according to a preferred embodiment of the present invention.

FIG. 5 is a block diagram of the posture control system according to a preferred embodiment of the present invention. The posture control system includes the remote control engine control unit (ECU) 29 connected to the remote control 25, the camera 27, the trim tab actuators 22A and 22B, and a boat control unit (BCU) 40 (controller).

Figure 6:
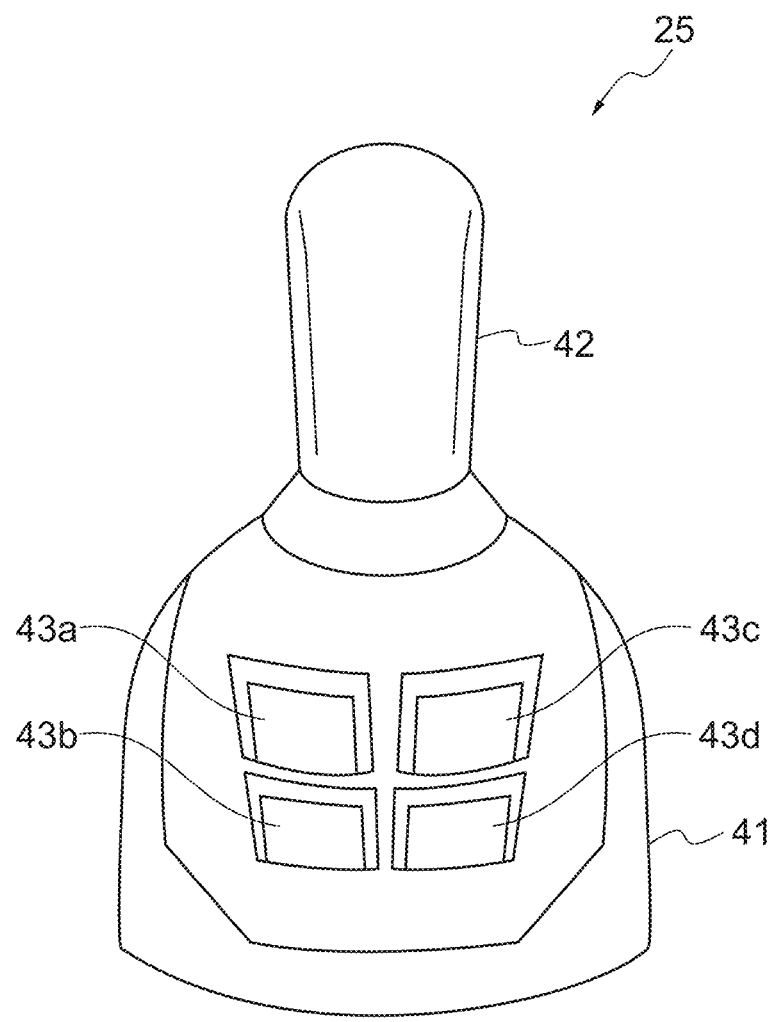
FIG. 6 is an external view schematically showing a configuration of a remote control included in the marine vessel.

FIG. 6 is an external view schematically showing a configuration of the remote control 25 included in the marine vessel 11. The remote control 25 includes the joystick 42 defining and functioning as an operator protruding upward from a base 41, and further includes a plurality of, for example, four settings buttons 43a to 43d installed on the base 41. The joystick 42 receives not only a tilting operation in all directions but also a pivoting operation by the vessel operator. When the joystick 42 receives the operation by the vessel operator, the remote control ECU 29 outputs a signal corresponding to the received operation to the BCU 40 or the controller 30. The BCU 40 or the controller 30 outputs control signals to the trim tab actuators 22A and 22B, the steering actuators 24A and 24B, and the PTT mechanisms 23A and 23B according to the received signal, thus causing the hull 13 to pivot, advance at a slow speed, or move backward at a slow speed. At this time, the BCU 40 or the controller 30 controls the trim tab actuators 22A and 22B, the steering actuators 24A and 24B, and the PTT mechanisms 23A and 23B such that the hull 13 moves in response to the movement of the joystick 42.

The settings buttons 43a to 43d are assigned to respective modes. For example, the settings button 43b is assigned to a joystick mode that prioritizes the vessel operation by the joystick 42 of the remote control 25 over the vessel operation by the steering wheel 18 or the throttle lever 12. When the settings button 43b is pressed down, the marine vessel 11 changes to the joystick mode, and when the settings button 43b is pressed down again, the joystick mode is canceled.

The settings button 43a is assigned to a fixed point hold mode that causes the marine vessel 11 (hull 13) to be positioned at a fixed point on the water. The fixed point hold mode further includes a plurality of sub modes. For example, when the settings button 43a is pressed for a short time, the marine vessel 11 shifts to a mode in which the position and orientation of the marine vessel 11 are maintained constant. However, when the settings button 43a is pressed and held, the marine vessel 11 shifts to a mode in which only the position of the marine vessel 11 is maintained constant. With a gauge (not shown), it is possible to set which sub mode is assigned to pressing the settings button 43a for a short time and pressing and holding the settings button 43a. Furthermore, as a sub mode, a mode is able to be set in which only the orientation of the marine vessel 11 is maintained constant. After the marine vessel 11 changes to the fixed point hold mode, the fixed point hold mode is canceled by pressing the settings button 43a for a short time.

Note that the auto trim tab mode (automatic control) is assigned to the operator of the setting operation unit 19, but may be assigned to the settings button 43c or the settings button 43d, for example.

Returning to FIG. 5, according to a preferred embodiment of the present invention, the remote control ECU 29 outputs a signal according to the pressing down of the settings button 43a to the BCU 40, and the BCU 40 controls the trim tab actuators 22A and 22B according to the signal to move each tab body 21 up and down. An image (captured image) captured (acquired) by the camera 27 is transmitted to the BCU 40, and the BCU 40 analyzes the image. According to the analysis result, the BCU 40 controls the trim tab actuators 22A and 22B to move each tab body 21 up and down. Note that if the marine vessel 11 does not include the BCU 40, the controller 30 implements the function of the BCU 40 described above.

When the marine vessel 11 (hull 13) has changed to the auto trim tab mode, the tab body 21 of each trim tab 20 moves up and down according to the posture of the hull 13. Therefore, as shown in FIG. 4, the tab body 21 may be lowered below an extension line of the bottom 44 of the hull 13. In this case, if the crew member 28 of the marine vessel 11 fishes aboard, depending on the flow of the tide, the fishing line 45 may drift toward the stern, and the crew member 28 needs to be concerned that the fishing line 45 may be entangled with the tab body 21 of the trim tab 20. To compensate for this, in the present preferred embodiment, when the crew member 28 fishes, the tab body 21 is raised.

Figure 7:
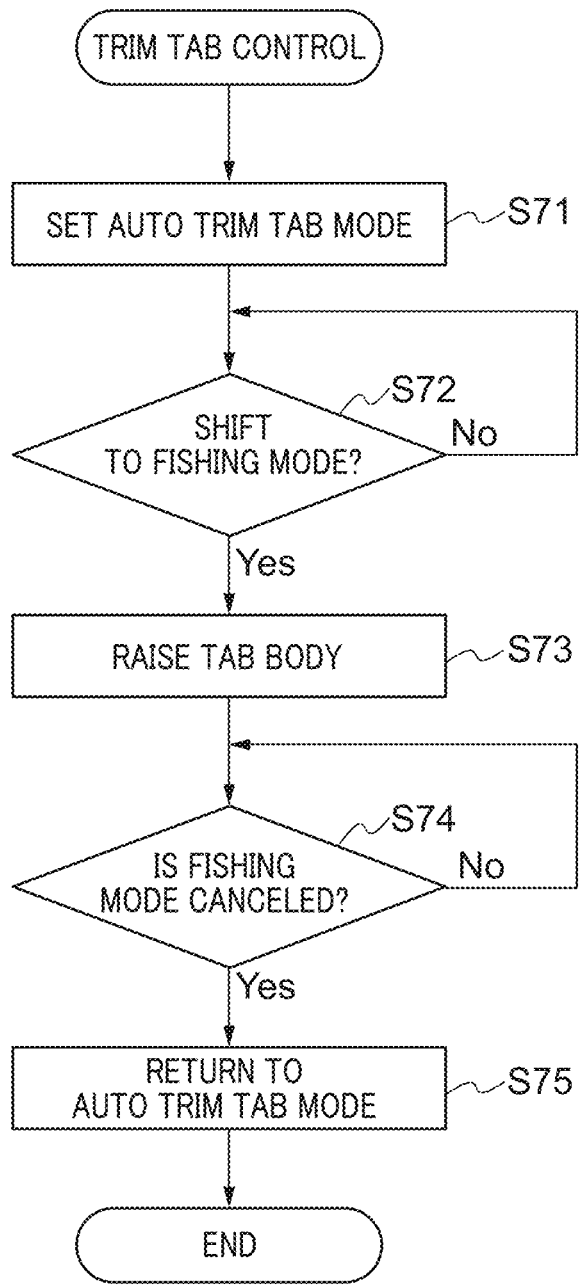
FIG. 7 is a flowchart showing a trim tab control process to be executed by the posture control system according to a preferred embodiment of the present invention.

FIG. 7 is a flowchart showing a trim tab control process to be executed by the posture control system according to a preferred embodiment of the present invention. The process in FIG. 7 is implemented, for example, by the BCU 40 in response to the controller 30 executing the control program loaded in the RAM 33.

In FIG. 7, to begin with, the auto trim tab mode is set according to the operation of the operator of the setting operation unit 19, the settings button 43a, or the like by the vessel operator (step S71). Then, it is determined whether the hull 13 has changed to the fishing mode (step S72).

The fishing mode in the present preferred embodiment corresponds to a case in which it is determined that at least one crew member 28 is fishing aboard. For example, when fishing, since it is preferable that at least one of the position and orientation of the marine vessel 11 is maintained constant, the fishing mode corresponds to a case in which the marine vessel 11 has changed to the fixed point hold mode.

Therefore, in step S72, when the remote control ECU 29 detects the pressing down of the settings button 43a, it is determined that the hull 13 has changed to the fishing mode.

Figure 8A:
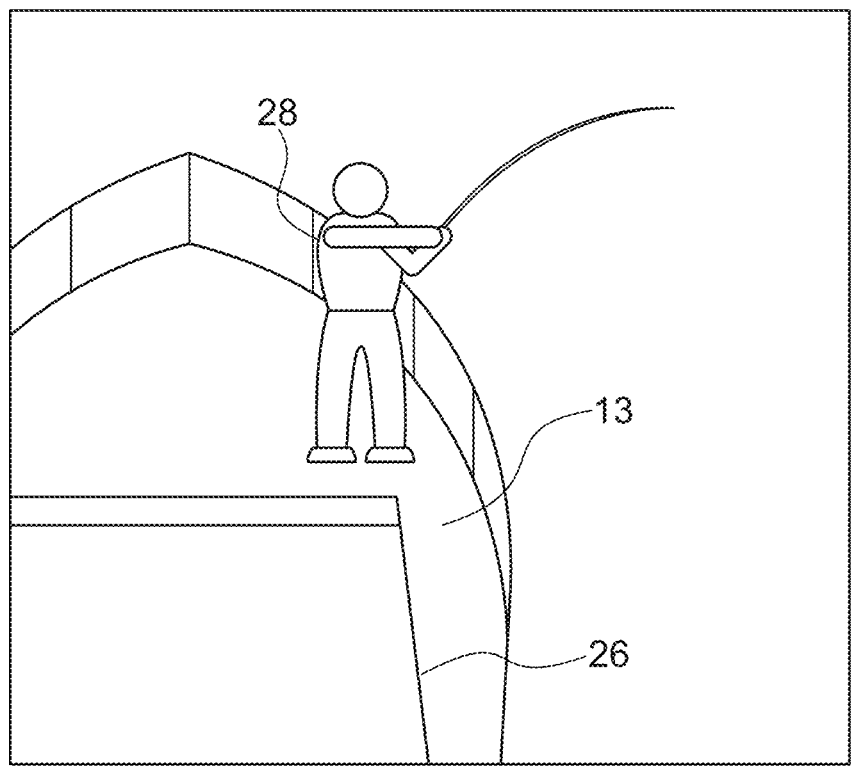
FIGS. 8A and 8B are each an example of an image showing a hull deck captured by a camera provided on the marine vessel.
Figure 8B:
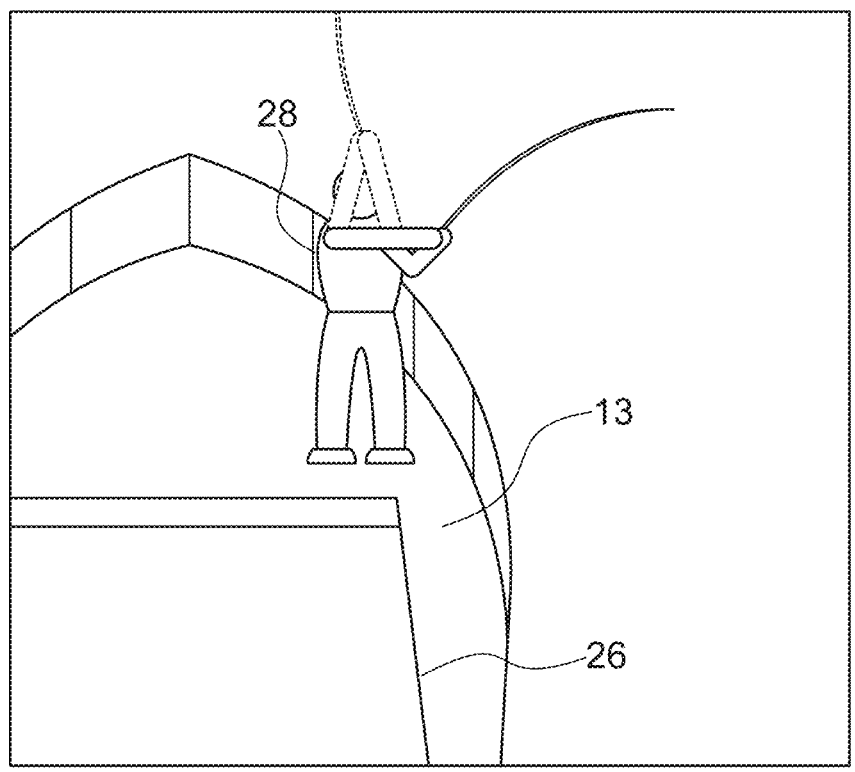

Meanwhile, as a result of analysis of the image of the camera 27 by the BCU 40, when it is determined that at least one crew member 28 is fishing aboard, this also corresponds to the fishing mode. For example, as shown in FIG. 8A, in the image captured by the camera 27, when at least one crew member 28 stands on the deck of the hull 13 and does not move for a certain period of time while maintaining a posture, it is determined that the hull 13 has changed to the fishing mode. Furthermore, as shown in FIG. 8B, even when at least one crew member 28 stands on the deck of the hull 13 and swings an arm up or down, it is determined that the hull 13 has changed to the fishing mode. That is, based on the posture or behavior of at least one crew member 28 in the image captured by the camera 27, it is determined whether the hull 13 has changed to the fishing mode. Note that the position of the crew member 28 on the hull 13 does not affect the determination as to whether the hull 13 has changed to the fishing mode.

Images to be analyzed by the BCU 40 are not limited to the images captured by the camera 27. For example, as shown in FIG. 9, the marine vessel 11 may carry a drone 46 (flying device), a camera 47 on the drone 46 taken off from the hull 13 may capture an image of the hull 13 from the sky, the drone 46 may transfer the image to the marine vessel 11, and the BCU 40 may analyze the image. The crew member 28 often flies the drone 46 in order to capture the image of the crew member 28 fishing. Therefore, it may be determined that the hull 13 has changed to the fishing mode when the drone 46 takes off from the hull 13.

Figure 10:
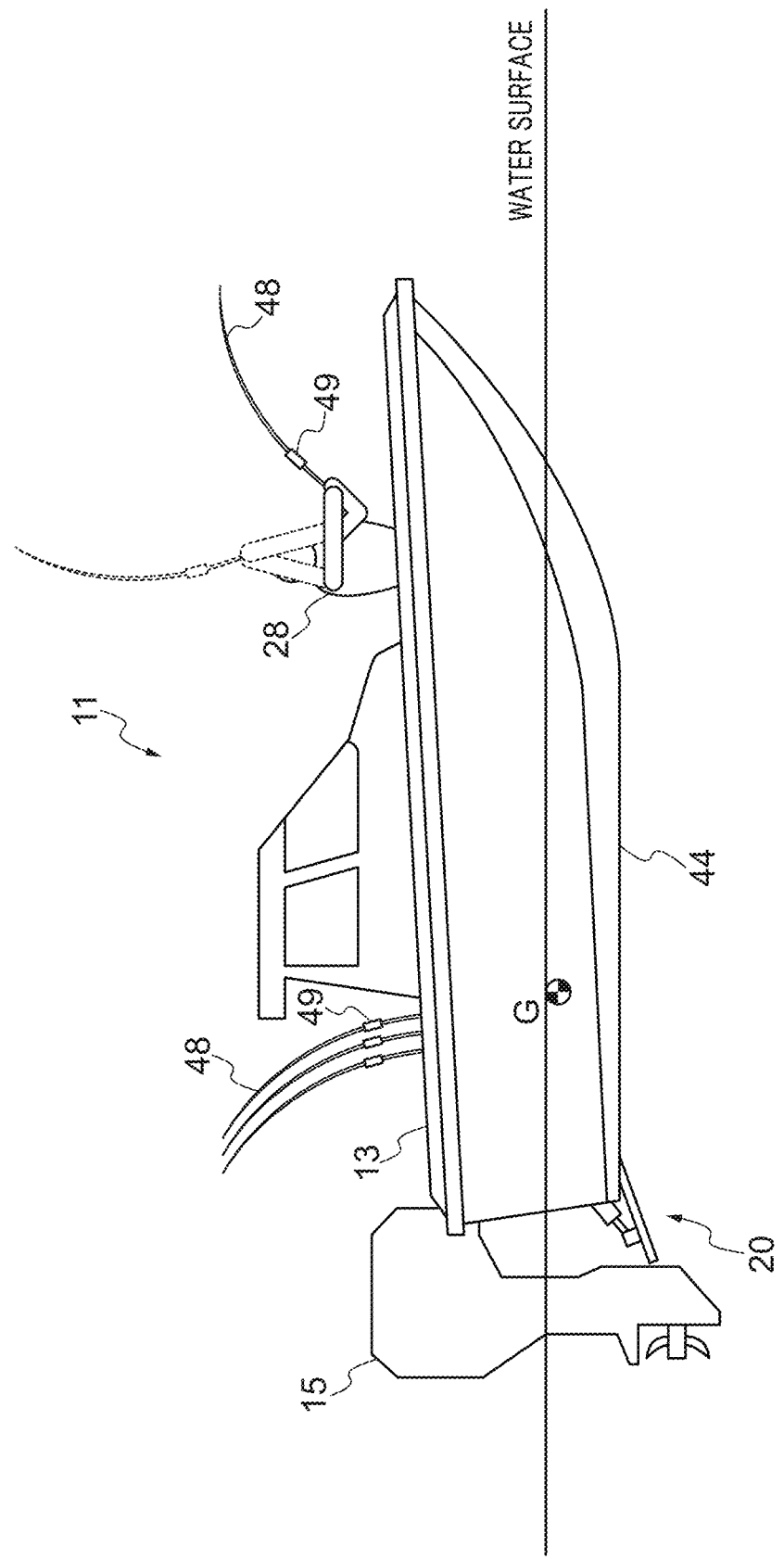
FIG. 10 is an external view schematically showing a configuration of a second variation of the marine vessel according to a preferred embodiment of the present invention.

Furthermore, as shown in FIG. 10, the marine vessel 11 may carry a fishing rod 48, a sensor 49 to detect the movement of the fishing rod 48 may be installed in the fishing rod 48, and the sensor 49 may notify the BCU 40 of the movement of the fishing rod 48 as a signal. In this case, when the sensor 49 detects a casting action of the fishing rod 48 and notifies the BCU 40 of the signal corresponding to the casting action, it is determined that the hull 13 has changed to the fishing mode.

Returning to FIG. 7, when it is determined in step S72 that the hull 13 has not changed to the fishing mode, the auto trim tab mode is maintained. On the other hand, when it is determined that the hull 13 has changed to the fishing mode, the BCU 40 controls the trim tab actuators 22A and 22B to raise each tab body 21 to a predetermined position (step S73). Here, the predetermined position is, for example, a position on the extension line of the bottom 44 of the hull 13 or a position above the extension line. Note that the predetermined position is not limited to this position, but may be a position above the position where the tab body 21 has been most lowered, and the fishing line 45 drifting toward the stern is not easily entangled with the tab body 21 at the predetermined position.

Then, it is determined whether the fishing mode has been canceled (step S74). The cancellation of the fishing mode corresponds to, for example, a case in which the fixed point hold mode has been canceled by pressing the settings button 43a for a short time. The cancellation also corresponds to a case in which the crew member 28 who does not move for a certain period while maintaining the posture cannot be confirmed for a predetermined period of time, or a case in which the crew member 28 swinging the arm up or down cannot be confirmed for a predetermined period of time in images captured by the camera 27 or the camera 47 on the drone 46. Furthermore, the cancellation corresponds to a case in which the drone 46 lands on the hull 13, and a case in which the sensor 49 of the fishing rod 48 does not detect the casting action of the fishing rod 48 for a predetermined period of time.

When it is determined in step S74 that the fishing mode has not been canceled, it is determined that the fishing mode continues, and the position of each tab body 21 is maintained at the raised predetermined position. On the other hand, when it is determined that the fishing mode has been canceled, the process ends and returns to the auto trim tab mode (step S75).

In the process shown in FIG. 7, even when the auto trim tab mode has been set, when it is determined that the hull 13 has changed to the fishing mode, the tab body 21 is raised to the predetermined position. That is, the raising of the tab body 21 in the fishing mode is prioritized over the lowering of the tab body 21 in the auto trim tab mode. Due to this operation, during fishing the fishing line 45 is not entangled with the tab body 21 even if the fishing line 45 drifts toward the stern. As a result, the crew member 28 fishing aboard the hull 13 does not need to take a position aboard the hull 13 to prevent the fishing line 45 from drifting toward the stern considering the flow of the tide, thus allowing more comfortable fishing.

Preferred embodiments of the present invention have been described above, but the present invention is not limited to the above-described preferred embodiments, and various modifications and changes can be made within the scope of the present invention.

For example, the process in FIG. 7 is based on the assumption that the auto trim tab mode is set once, but steps S72 to S74 may be executed in a state in which the auto trim tab mode has not been set.

The device that enables setting the fixed point hold mode is not limited to the remote control 25, but may be, for example, a simple remote control switch such as the setting operation unit 19 or a fishing support remote control (made by Yamaha Motor Co., Ltd.)

Furthermore, the marine vessel 11 may be equipped with a radio-controlled small aircraft or a small helicopter instead of the drone 46, and a camera of the small aircraft or small helicopter may capture an image of the hull 13 from the sky. When the small aircraft or the small helicopter takes off from the hull 13, it may be determined that the hull 13 has changed to the fishing mode.

Furthermore, the marine vessel 11 includes the outboard motors 15 in the preferred embodiments described above, but the marine vessel 11 may include other types of marine propulsion devices such as an inboard/outboard motor (stern drive, inboard motor/outboard drive), and an inboard engine (inboard motor).

Note that as the posture control tab, interceptor tabs described in Zipwake described above may be used instead of the tab body 21. The interceptor tabs are attached to both sides of the stern of the hull 13 and are displaced almost vertically. Specifically, the interceptor tab is displaced underwater from a position protruding from the lower surface (ship's bottom) of the hull 13 to a housed position above the lower surface of the hull 13. When it is determined that the hull 13 has changed to the fishing mode, the interceptor tab is pulled up to a position where the interceptor tab does not protrude from the lower surface of the hull 13.

The posture control system may be configured such that the setting operation unit 19 is able to set whether to execute the posture control method (for example, the process in FIG. 9 or the process in FIG. 10) when starting the vessel operation system.

Note that when the marine vessel 11 moves backward, the tab body 21 of each trim tab 20 is raised to the descent rate 0% position, and the process in FIG. 7 is not executed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A posture control system comprising:
a posture control tab attached to a stern of a hull to control a posture of the hull;
a driver to drive the posture control tab; and
a controller configured or programmed to control the driver; wherein
when it is determined that the hull has changed to a fishing mode, the controller causes the driver to raise the posture control tab to a predetermined position.

2. The posture control system according to claim 1, wherein, even when an automatic control of the posture control tab is being executed and it is determined that the hull has changed to the fishing mode, the controller is configured or programmed to cause the driver to raise the posture control tab to the predetermined position.

3. The posture control system according to claim 2, wherein when it is determined that the fishing mode has been canceled, the controller is configured or programmed to execute the automatic control of the posture control tab.

4. The posture control system according to claim 1, wherein the controller is configured or programmed to determine that the hull has changed to the fishing mode when an operation to shift the hull to a fixed point hold mode is detected.

5. The posture control system according to claim 1, wherein the controller is configured or programmed to determine that the hull has changed to the fishing mode when at least one crew member is fishing based on a captured image.

6. The posture control system according to claim 5, wherein the controller is configured or programmed to determine whether the crew member is fishing based on a behavior of the crew member in the captured image.

7. The posture control system according to claim 5, wherein the controller is configured or programmed to determine whether the crew member is fishing based on a posture of the crew member in the captured image.

8. The posture control system according to claim 5, wherein the captured image is acquired by an image capturing device provided on the hull.

9. The posture control system according to claim 5, wherein the captured image is acquired by a flying device that took off from the hull.

10. The posture control system according to claim 1, wherein the controller is configured or programmed to determine that the hull has changed to the fishing mode when a flying device takes off from the hull.

11. The posture control system according to claim 1, wherein
the hull includes a fishing rod including a sensor; and
the controller is configured or programmed to determine that the hull has changed to the fishing mode when the sensor detects a casting action of the fishing rod.

12. The posture control system according to claim 1, wherein the predetermined position is a position above an extension line of a bottom of the hull.

13. A marine vessel comprising:
a posture control system including:
a posture control tab attached to a stern of a hull to control a posture of the hull;
a driver to drive the posture control tab; and
a controller configured or programmed to control the driver; wherein
when it is determined that the hull has changed to a fishing mode, the controller causes the driver to raise the posture control tab to a predetermined position.

14. A posture control system comprising:
an image capturing device to acquire a captured image; and
a controller configured or programmed to determine whether at least one crew member is fishing based on the captured image.

15. The posture control system according to claim 14, further comprising:
a posture control tab attached to a stern of a hull to control a posture of the hull; and
a driver to drive the posture control tab; wherein
when it is determined that the at least one crew member is fishing, the controller causes the driver to raise the posture control tab to a predetermined position.

* * * * *